Patented Oct. 31, 1939

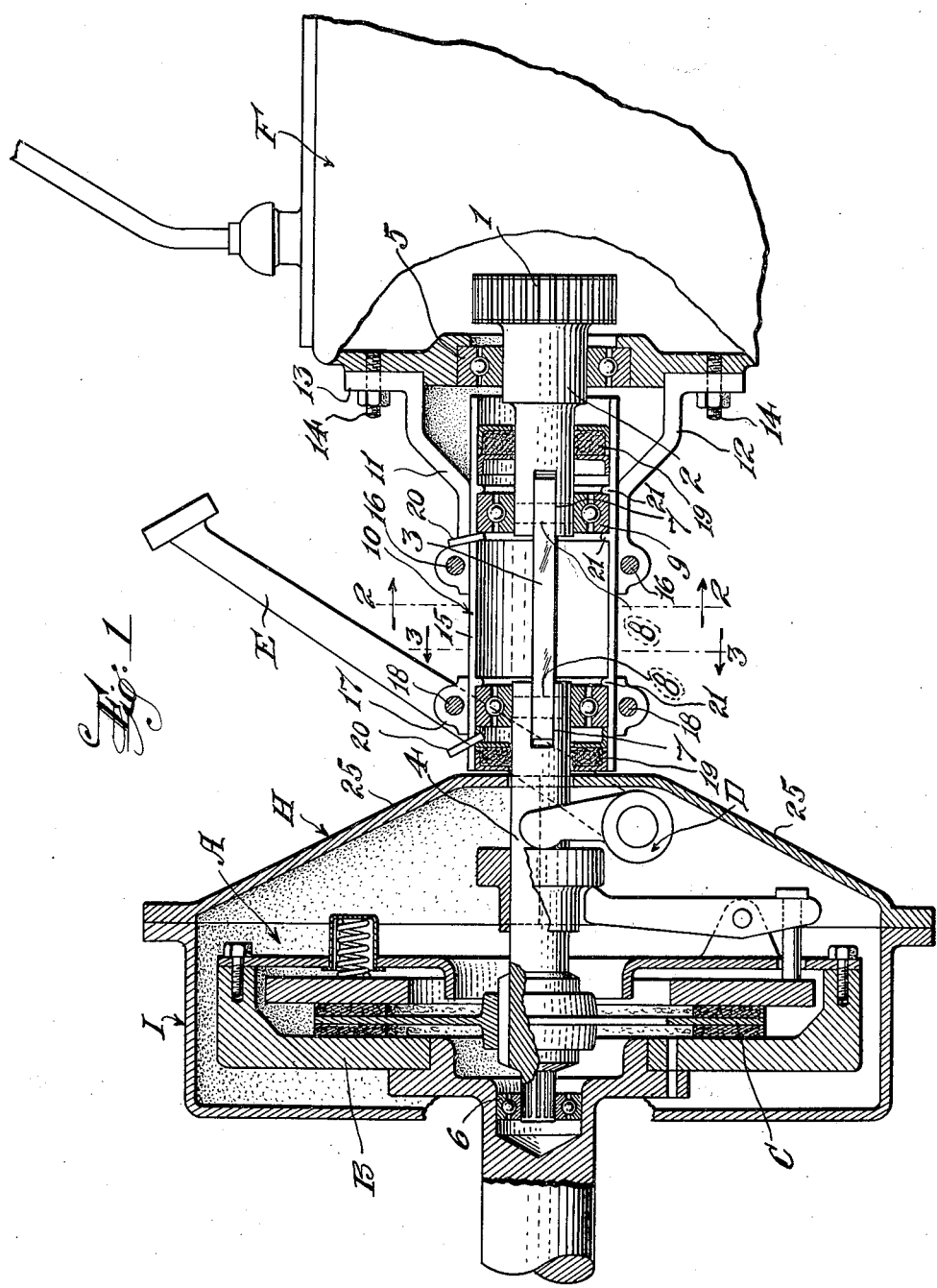

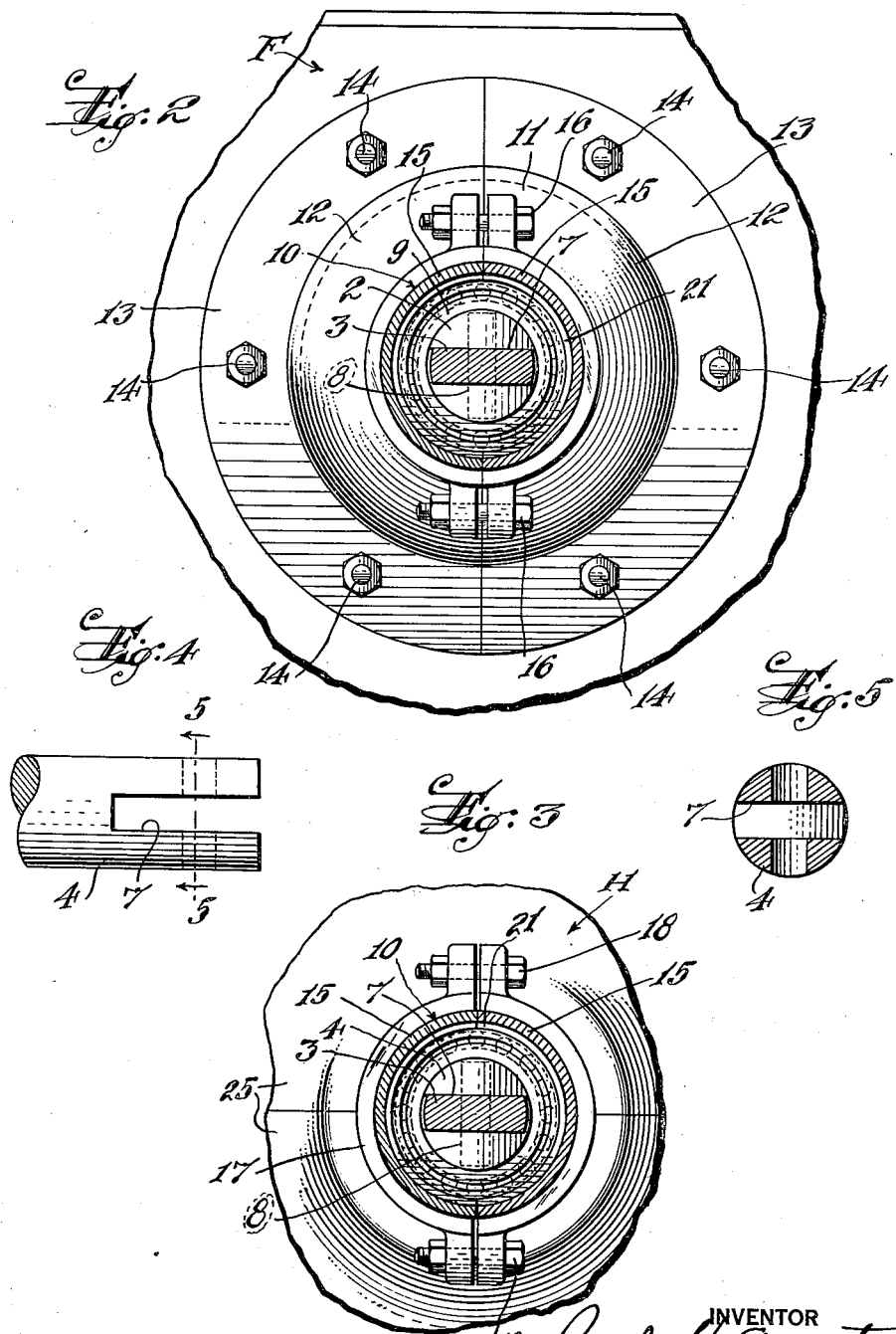

2,178,331

UNITED STATES PATENT OFFICE 2,178,331

FLOATING PILOT SHAFT

Paul H. Armstrong, Orange, N. J.

Application March 10, 1938, Serial No. 194,991

4 Claims. (Cl. 64—1)

This invention relates particularly to the so-called pilot shaft which connects the clutch of an automobile power plant to the power transmission and speed change gearing.

In automobile power plants as now generally constructed the pilot shaft is formed in one piece, and in order to install a new clutch, ring gear or pilot shaft bearing, it has been necessary to remove the transmission gearing and drive shaft or take out the motor. These operations generally require at least one day, and frequently two days, and generally two men are required to perform the work.

One object of my invention is to provide a novel and improved pilot shaft connection between the transmission gear and the clutch of an automobile power plant, whereby the clutch may be removed by one man and in a short time replaced or repaired without the necessity of disturbing the transmission gearing or the motor.

Another object is to provide a novel and improved pilot shaft which shall include a plurality of separably connected sections, and a novel and improved mounting or bearing for the pilot shaft, whereby the pilot shaft and its mounting can be easily and quickly disassembled and removed to permit easy and quick replacement or repair of the clutch of the power plant of which the pilot shaft forms a part.

Other objects, advantages and results of the invention will appear from the following description when read in conjunction with the accompanying drawings in which Figure 1 is a vertical longitudinal sectional view through a pilot shaft mounting embodying my invention showing the shaft in side elevation and in conjunction with a known type of clutch and transmission gearing which are shown fragmentarily and schematically.

Figure 2 is an enlarged transverse vertical sectional view on the line 2—2 of Figure 1.

Figure 3 is a similar view on the line 3—3 of Figure 1.

Figure 4 is an enlarged side elevation of the bifurcated end of one of the pilot shaft sections and Figure 5 is a transverse sectional view on the line 5—5 of Figure 4.

Specifically describing the invention, the reference character A designates a known type of automobile clutch which includes the flywheel B, clutch disc C and the usual operating mechanism D including the foot lever E.

The reference character F designates the casing of the transmission gearing in which the usual speed change gearing is arranged, including a gear 1 which is mounted on one end of the pilot shaft.

In accordance with my invention the pilot shaft for connecting the clutch to the speed change gearing comprises three sections 2, 3 and 4 which are separably connected together in axial alinement. As shown, the section 2 carries the gear 1 and is journaled in a roller bearing 5 in the transmission gear casing F. The section 4 has one end journaled in a roller bearing 6 in the flywheel shaft and is connected to the clutch disc C in the usual manner. The section 3 connects the sections 2 and 4 and as shown, the adjacent ends of the sections 2 and 4 are bifurcated or formed with transverse slots 7 in which the ends of the section 3 are fitted. For positively connecting the section 3 to the sections 2 and 4, removable pins 8 are inserted through the ends of the sections 2 and 4 and the corresponding ends of the section 3.

The pilot shaft is supported adjacent the points of connection of the sections 2 and 4 with the section 3 by roller bearings 9 which are mounted in a casing 10 which is in turn supported by a bracket housing 11.

The adjacent ends of the sections 2 and 4 when the pilot shaft is installed in the power plant are spaced apart a distance sufficient to permit the section 4 to be axially pulled out and removed from the clutch when the section 3 is disconnected from the sections 2 and 4.

To permit a minimum of space between the ends of the shaft sections 2 and 4 and at the same time enable the shaft section 4 to be cleared from the clutch, as well as to allow easy access to the clutch parts, the end wall H of the clutch casing I may be formed in two complemental sections 25 applicable and removable from opposite sides of the pilot shaft, or the end wall H may be omitted or so shaped as to provide ample clearance for lateral removal of the shaft from the clutch casing.

The bracket housing 11 comprises two complemental sections 12 having basal flanges 13 secured to the side of the transmission gear casing F by bolts 14, the sections being applicable about the pilot shaft from opposite sides thereof.

The casing 10 also comprises two complemental semi-cylindrical sections 15 applicable about the pilot shaft from opposite sides thereof, and one end of the casing 10 is inserted into and clamped in the bracket housing 11 by bolts 16 connecting the two sections 12 of the bracket housing adjacent its outer end. The other ends of the sections 15 of the casing 10 are held together by a split ring 17 the sections of which are clamped together in encircling relation to the casing by bolts 18. Preferably lubrication seals 19 are disposed between the roller bearings 9 and the respective ends of the housing 10, and suitable oil or grease fittings 20 are provided for supplying oil or grease to the bearings.

The inner walls of the casing 10 preferably have ribs, lugs or other suitable means 21 for holding the bearings 9 in position and against longitudinal movement in the housing.

In operation, the pilot shaft is firmly supported and journaled in the bearings 6, 9 and 5, the bearings 9 effectually holding the shaft sections 2, 3 and 4 in alinement with each other and also reenforcing the points of connection of the sections 2 and 4 with the section 3. The bracket housing 11 and the split ring 17 in conjunction with the casing 10, provide stable supports for the bearings 9.

As above indicated the purpose of the invention is primarily to permit easy and quick replacement or repair of the clutch A. When it is desired to do this, the bracket housing sections 11 are removed by removing the bolts 14 and 16. The sections of the split ring 17 are then separated by removing the bolts 18 whereupon the two sections of the casing 10 may be separated and removed. This will expose the bearings 9 and ends of the shaft sections 2, 3 and 4. Thereupon the bearings 9 are slid inwardly on their respective shaft sections and pins 8 are removed to permit sliding of the shaft section 3 laterally out of the slots 7. Then if necessary the end wall H of the clutch casing may be removed, and the section 4 of the pilot shaft is slid axially toward the section 2 to disconnect the shaft from the clutch. Thereupon the clutch parts may be removed or repaired as may be desired.

All of these operations can be performed by one man and in most cases within a short period, for example, one or two hours. This is in sharp contrast with the present structure and practice which requires generally at least one day and sometimes two, and generally two men, to remove or repair the clutch of an automobile power plant.

While I have shown and described the invention as embodied in certain details of construction it should be understood that this is primarily for illustrating the principles of the invention and that many changes may be made in the details of structure without departing from the spirit or scope of the invention.

Having thus described my invention, what I claim is:

1. The combination with a clutch and speed change gearing of an automobile power plant, of a pilot shaft operatively connecting said clutch to the speed change gearing and formed of a plurality of separably connected sections, a casing comprising two complemental sections applicable about said shaft from opposite sides thereof, a bracket housing comprising two complemental sections applicable about said casing from opposite sides thereof, means separably mounting said bracket housing on a fixed support with one end of said casing supported in said housing, means for fastening together the other ends of said casing sections, bearings in said casing supporting the connected ends of said shaft sections, and bearings for the other ends of said sections that are connected to said clutch and to said speed change gearing respectively.

2. The combination with a clutch and speed change gearing of an automobile power plant, of a pilot shaft operatively connecting said clutch to the speed change gearing and formed of a plurality of separably connected sections, one section being connected at one end to said speed change gearing, another section being connected at one end to said clutch with its other end in spaced relation to the first section, and a third section interposed between the adjacent ends of the other sections, said adjacent ends of the first two sections being bifurcated to receive the ends of said third section, means separably securing the ends of said third section in the bifurcations of the other sections to operatively connect said sections together, a casing comprising two complemental sections applicable about said shaft from opposite sides thereof, a bracket housing comprising two complemental sections applicable about said casing from opposite sides thereof, means separably mounting said bracket housing on a fixed support with one end of said casing supported in said housing, means for fastening together the other ends of said casing sections, bearings in said casing supporting the connected ends of said shaft sections, and bearings for the other ends of said sections that are connected to said clutch and to said speed change gearing respectively.

3. Means for transmitting power from one device to another comprising a shaft including a plurality of axially alined separably connected sections, one section operatively connected to one of said devices and another section operatively connected to the other device, a casing to be mounted on a fixed support and comprising complemental sections applicable to said shaft from opposite sides thereof, and bearings in said casing for supporting said shaft sections in axial alinement including bearings at the points of connection of said shaft sections to each other.

4. The combination with a clutch and speed change gearing of an automobile power plant, of a pilot shaft operatively connecting said clutch to the speed change gearing and formed of a plurality of separably connected sections, one section being connected at one end to said speed change gearing, another section being connected at one end to said clutch with its other end in spaced relation to the first section, and a third section interposed between the adjacent ends of the other sections, and means separably connecting said third section to the other sections to permit connection and disconnection of the third section to and from the other sections upon lateral movement of the third section relative to the other sections, a casing comprising two complemental sections applicable about said shaft from opposite sides thereof, means separably securing said sections together, and journal bearings in said casing for supporting said shaft sections in axial alinement.

PAUL H. ARMSTRONG.